(12) United States Patent  
Kuo et al.

(10) Patent No.: US 8,267,443 B1  
(45) Date of Patent: Sep. 18, 2012

(54) LATCH WITH CAMMED RETURN

(75) Inventors: Chen-Chien Kuo, Taipei (TW); Huai-Wen Fu, Taipei Hsien (TW)

(73) Assignee: Flextronics AP, LLC, Broomfield, CO (US)

( * ) Notice: Subject to any disclaimer, the term of this patent is extended or adjusted under 35 U.S.C. 154(b) by 1127 days.

(21) Appl. No.: 12/123,525

(22) Filed: May 20, 2008

Related U.S. Application Data

(60) Provisional application No. 60/931,255, filed on May 22, 2007.

(51) Int. Cl.
*E05C 19/06* (2006.01)
*E05C 1/02* (2006.01)

(52) U.S. Cl. .............. 292/137; 292/19; 292/80; 292/87; 292/91

(58) Field of Classification Search .................... 292/19, 292/80, 81, 86, 87, 91, 137; 312/223.2; 361/726
See application file for complete search history.

(56) References Cited

U.S. PATENT DOCUMENTS

| | | | |
|---|---|---|---|
| 6,297,948 B1 * | 10/2001 | Buican et al. | 361/679.58 |
| 6,356,436 B1 * | 3/2002 | Buican et al. | 361/679.58 |
| 6,899,407 B1 * | 5/2005 | Lai | 312/223.2 |
| 7,082,036 B2 * | 7/2006 | Cheng et al. | 361/726 |
| 7,208,686 B1 * | 4/2007 | Chen et al. | 174/561 |

* cited by examiner

*Primary Examiner* — Carlos Lugo
(74) *Attorney, Agent, or Firm* — Marsh Fischmann & Breyfogle, LLP; James L. Johnson

(57) ABSTRACT

A computer housing (10) is disclosed, that uses a camming action to move a latch (62). The latch (62) is movable between at least two positions—a latching position and an unlatching position. Moving the latch (62) to its unlatching position causes the latch (62) to engage and move one or more latching members or snaps (42) that detachably engage a bezel (38). Once the latching members or snaps (42) have been sufficiently moved, the bezel (38) may be moved away from the remainder of the computer housing (10). Reattaching the bezel (38) to the computer housing (10) automatically moves the latch (62) back to its latching position.

23 Claims, 11 Drawing Sheets

LATCH WITH CAMMED RETURN

CROSS-REFERENCE TO RELATED APPLICATIONS

This patent application claims priority under 35 U.S.C. §119(e) to U.S. Patent Provisional Patent Application Ser. No. 60/931,255, that was filed on May 22, 2007, that is entitled "LATCH WITH CAMMED RETURN," and entire disclosure of which is hereby incorporated by reference in its entirety herein.

FIELD OF THE INVENTION

The present invention generally relates to the field of computer housings and, more particularly, to latches used to detachably interconnect one computer housing section with another computer housing section.

BACKGROUND

Various types of housings exist for computers, including desktop computers. These housings are sometimes referred to as computer cases, enclosures, towers, cabinets, or the like. In any case, at least some computer housings incorporate what may be referred to as a bezel. The bezel may be in the form of a front panel for a computer housing. The bezel may be removed to gain access to the interior of the computer housing. It is common for the bezel to be attached to the chassis by screws or the like, and it is oftentimes time-consuming and/or cumbersome to remove the bezel.

SUMMARY

A first aspect of the present invention is embodied by an assembly having a first part (e.g., a bezel), a second part (e.g., a chassis), and a latch. The first part includes a first latching member (e.g., a "snap" for a snap-lock type configuration), which in turn has what may be characterized as a camming surface. The first latching member is engageable with the second part to latch the first and second parts together. The latch may be moved from a home or first position to engage the first latching member in a manner so as to unlatch the second part from the first part. Conversely, the camming surface of the first latching member may be engaged with the latch at least at some point in time as the first and second parts are being latched together so as to move the latch at least toward its home or first position. Therefore, the first latching member is used as a "return" for the latch in the case of the first aspect.

A second aspect of the present invention is embodied by an assembly having a first part (e.g., a bezel), a second part (e.g., a chassis), and a latch. The first part includes a first latching member (e.g., a "snap" for a snap-lock type configuration), which in turn includes a head. This head includes both a latching surface and a camming surface. The first latching member is engageable with the second part to latch the first and second parts together. The latch may be moved so as to engage the first latching member and move its latching surface out of what they be characterized as a locking alignment with the second part. Conversely, the first latching member may be moved relative to the latch such that its camming surface engages and moves the latch to a position that allows the latching surface of the first latching member to be in what may be characterized as a locking alignment with the second part (e.g., to latch the first part to the second part).

A third aspect of the present invention is generally directed to an assembly having a first part (e.g., a bezel), a second part (e.g., a chassis), and a latch. The first part includes a first latching member (e.g., a "snap" for a snap-lock type configuration), that in turn includes a head, while the second part includes what may be characterized as a latching aperture or the like. The head of the first latching member is extendable through the latching aperture and may engage the second part in a manner so as to latch the first and second parts together. The latch may be moved so as to engage the head of the first latching member and move this head into alignment with the latching aperture of the second part, such that the first part may be unlatched from the second part. Conversely, the first latching member may be moved relative to the latch such that to its head passes through the latching aperture in the second part to engage and move the latch to a position where the first latching member can latch the first and second parts together.

A fourth aspect of the present invention is directed to latching and unlatching first and second parts. A latch may be moved from a first position to a second position. This movement in turn may be used to move a first latching member to an unlatching position. Thereafter, the first part may be moved relative to the second part. The first and second parts may also be moved relatively toward each other to latch the first and second parts together. This particular movement in turn may be used to move the latch back at least toward its first position. The latching and unlatching operations may be performed in any order in the case of the fourth aspect.

A fifth aspect of the present invention is directed to latching and unlatching first and second parts. A latch may be moved from a first position to a second position. A first latching member may be moved to an unlatching position while being engaged by the latch as it is moving toward its second position. The first and second parts are unlatched from each other with the first latching member in its unlatching position. The first and second parts may also be latched together using the first latching member. In this regard, the first latching member may engage the latch during the latching together of the first and second parts so as to move the latch at least toward its first position. The latching and unlatching operations may be performed in any order in the case of the fifth aspect.

Various refinements exist of the features noted in relation to each of the above-noted aspects of the present invention. Further features may also be incorporated in each of the above-noted aspects of the present invention as well. These refinements and additional features may exist individually or in any combination. Initially, one or more features from each of the above-noted aspects may be utilized by any of the other above-noted aspects. Moreover, the assembly in each of the above-noted aspects may be of any appropriate size, shape, configuration, and/or type. In one embodiment, the assembly is in the form of a computer housing, the first part is in the form of a bezel, and the second part is in the form of a chassis or some "remainder" of the computer housing.

The first latching member may be moved from a latching position to an unlatching position by a movement of the latch away from its home or first position. This movement may be the result of at least a portion of the first latching member being deflected when engaged by the latch that is being moved. In one embodiment, the latch interfaces with a camming surface of the first latching member when moving the first latching member from a latching position to an unlatching position. In another embodiment, the latch interfaces with what may be characterized as ahead of the first latching member when moving the first latching member from a latching position to an unlatching position.

Any camming surface utilized by the first latching member to interface with the latch may be of any appropriate configuration, and furthermore may be disposed in any appropriate orientation. What is desirable is for any such camming surface to exert a force on the latch to move the same back toward its home or first position as the first and second parts are being latched together. In one embodiment, the camming surface is at least substantially planar or flat, and is disposed at a non-perpendicular angle relative to the direction in which the latch moves when unlatching and latching the first and second parts. Incorporating a camming surface on the first latching member may alleviate the need to utilize a return spring or the like for the latch. Stated another way, the latch may be biased toward its home, first, or latching position primarily, and in one embodiment solely, by an engagement of the camming surface of the first latching member with the latch.

Any appropriate number of first latching members may be utilized, and multiple first latching members may be disposed in any appropriate arrangement. The first latching member may be associated with the first part in any appropriate manner. For instance, the first latching member may be integrally formed with the first part. Alternatively, the first latching member could be separately attached to the first part in any appropriate manner. In one embodiment, the first latching member is at least generally of a configuration that is commonly associated with providing a snap'-lock type of interconnection between a pair of parts. Therefore, the first latching member may be characterized as being in the form of a "snap."

The latch may move in any appropriate manner to provide a latching position and an unlatching position for the first latching member. In one embodiment, the latch moves at least generally along an axial path. In another embodiment, the latch is slidably interconnected with the second part of the assembly (e.g., with the chassis).

The first latching member may be characterized as being movable between a latching position and an unlatching position. The first and second parts may be characterized as being latched together with the first latching member being in its latching position, while the first and second parts may be characterized as being unlatched when the first latching member is in its unlatching position. A movement of the latch away from its home, first, or latching position may be used to dispose the first latching member in its unlatching position (e.g., by an engagement of the latch with the first latching member, and with continued movement of the latch away from its home, first, or latching position). Conversely, moving the first latching member into at least somewhat of a forcible engagement with the latch may cause the first latching member to move the latch at least toward its home, first, or latching position.

DETAILED DESCRIPTION

Figure 1A:
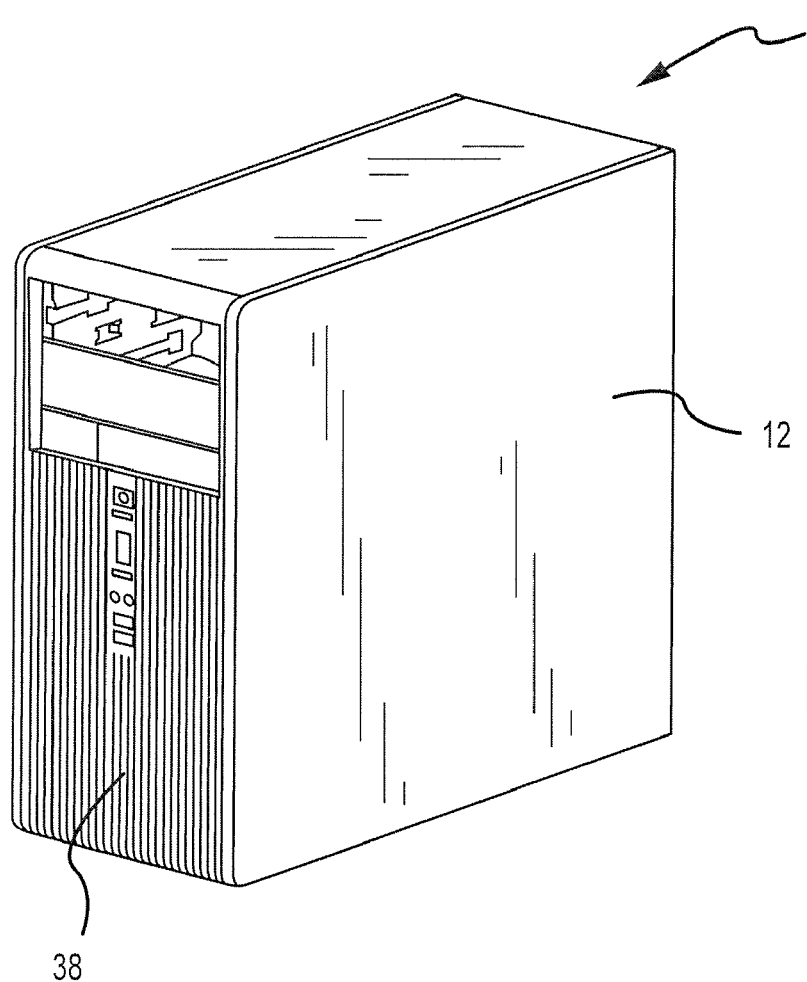
FIG. 1A is a perspective view of one embodiment of a computer housing.
Figure 1B:
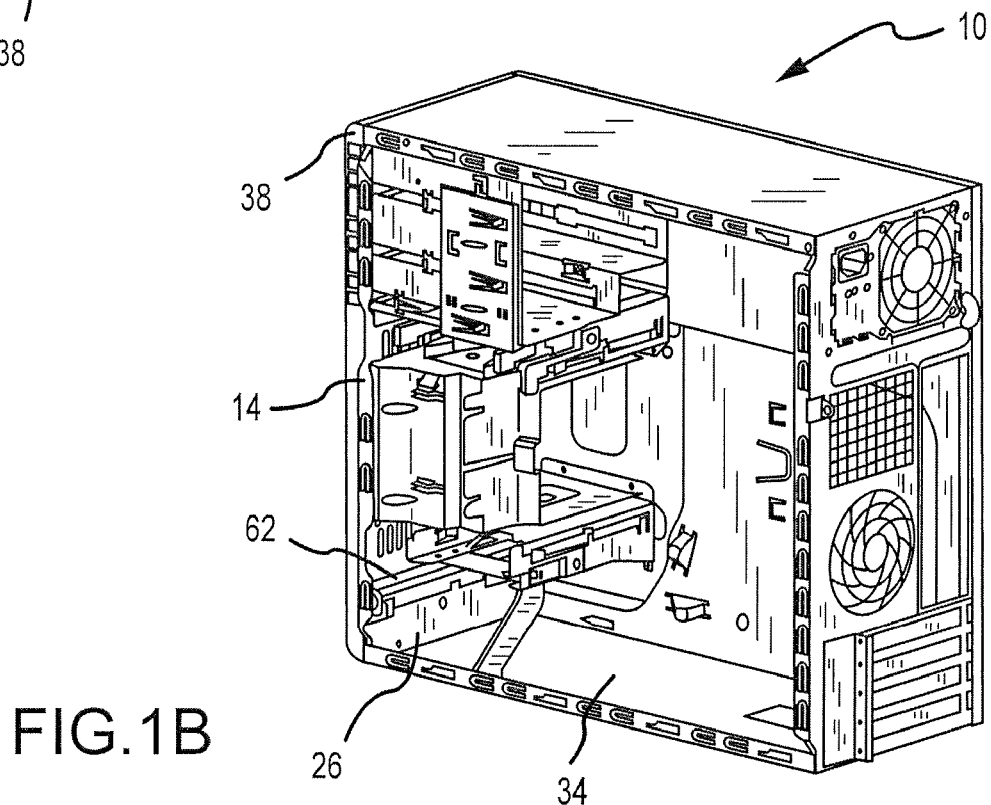
FIG. 1B is a perspective view of a portion of the interior of the computer housing of FIG. 1A, with one of the side panels having been removed to illustrate a latch for latching/unlatching a bezel and chassis that are each part of the computer housing.
Figure 1C:
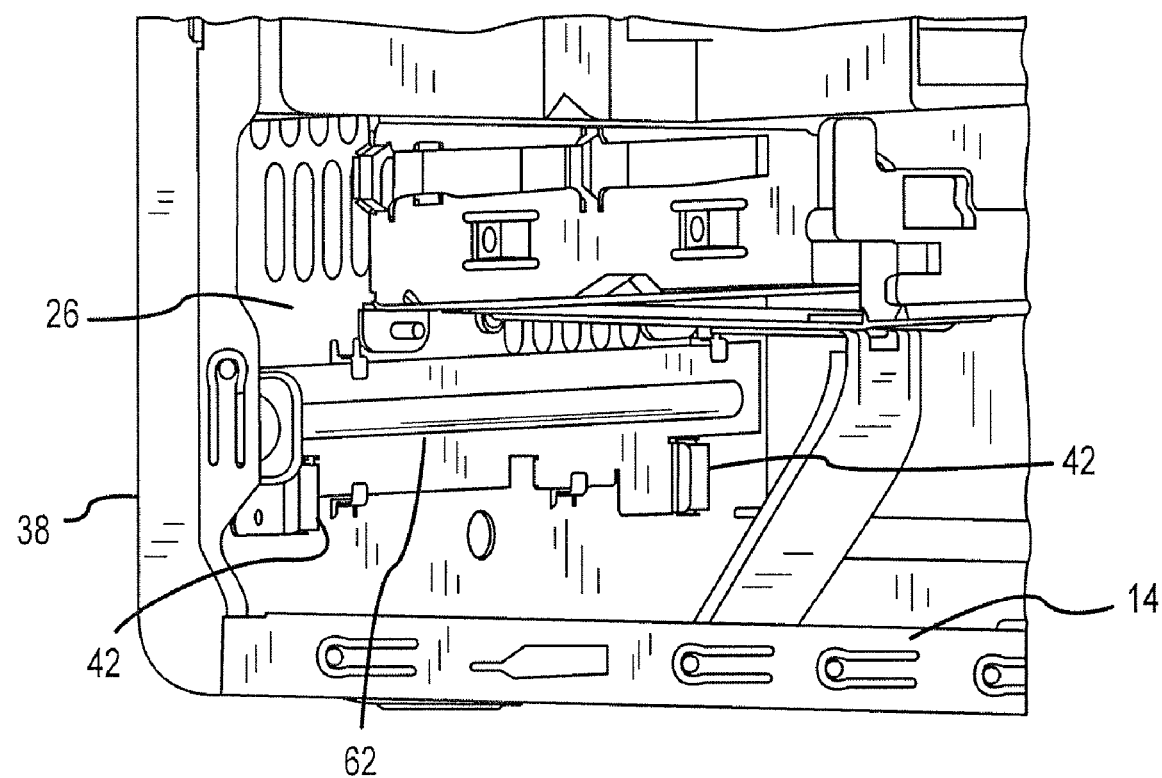
FIG. 1C is an enlarged, perspective view of the latch shown in FIG. 1B.

FIGS. 1A-C illustrate one embodiment of a computer housing 10 having a chassis 14 and a bezel 38 that may be detachably interconnected with the chassis 14. The interior of the computer housing 10 may include one or more computer components, such as a hard drive, disk drive, a CD/DVD drive, and the like. The chassis 14 includes an end wall 26, a bottom wall 34, and a pair of side panels 12 (FIGS. 1B and 1C have one of the side panels 12 removed). Another of the components that is associated with the computer housing 10 is a latch 62. The latch 62 may be movably interconnected with the end wall 26 of the chassis 14 in any appropriate manner. The latch 62 is movable between two general positions—a latching position and an unlatching position. The bezel 38 is latched to the chassis 14 with the latch 62 being in the latching position. At least part of the bezel 38 may be moved away from the chassis 14 when the latch 62 is moved to its unlatching position.

Figure 2A:
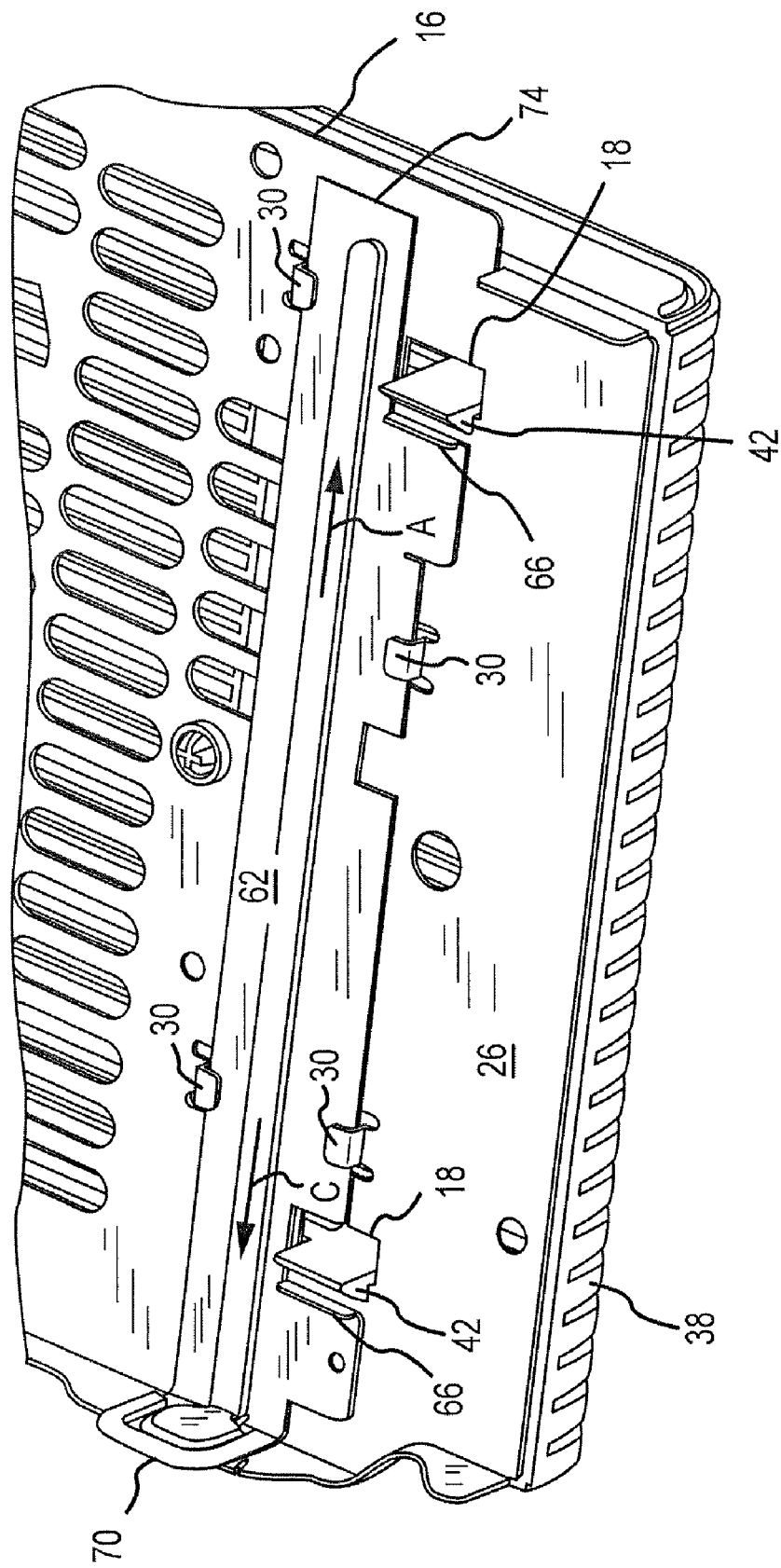
FIG. 2A is an enlarged, perspective view the latch used by the computer housing of FIG. 1A, along with a pair of latching members or snaps of the bezel that latch the bezel to the chassis.
Figure 2B:
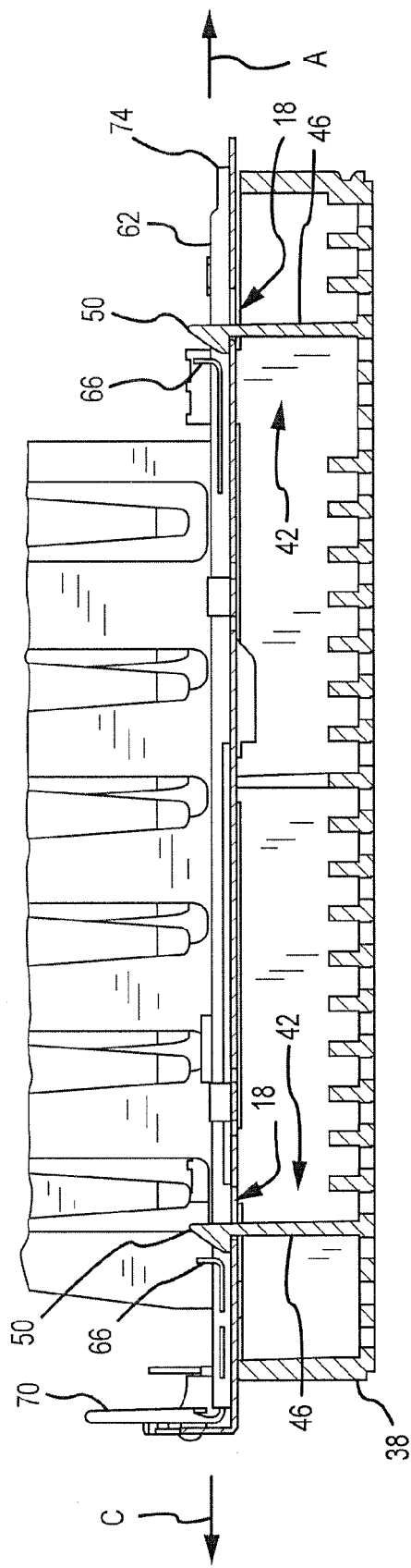
FIG. 2B is a cutaway or sectional view of the latch and snaps shown in FIG. 2A, with the latch being in its latching position.
Figure 2C:
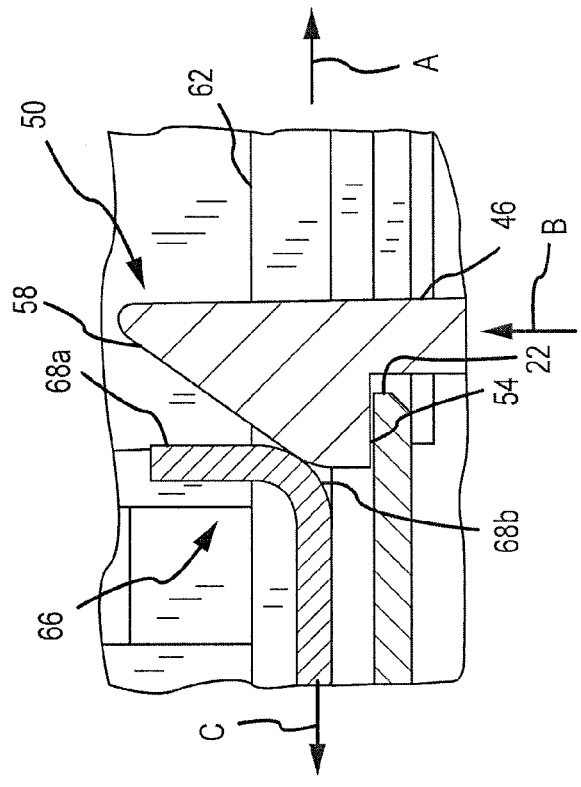
FIG. 2C is an enlarged view that shows the interaction between the latch and the head of one of the snaps shown in FIGS. 2A and 2B.
Figure 3A:
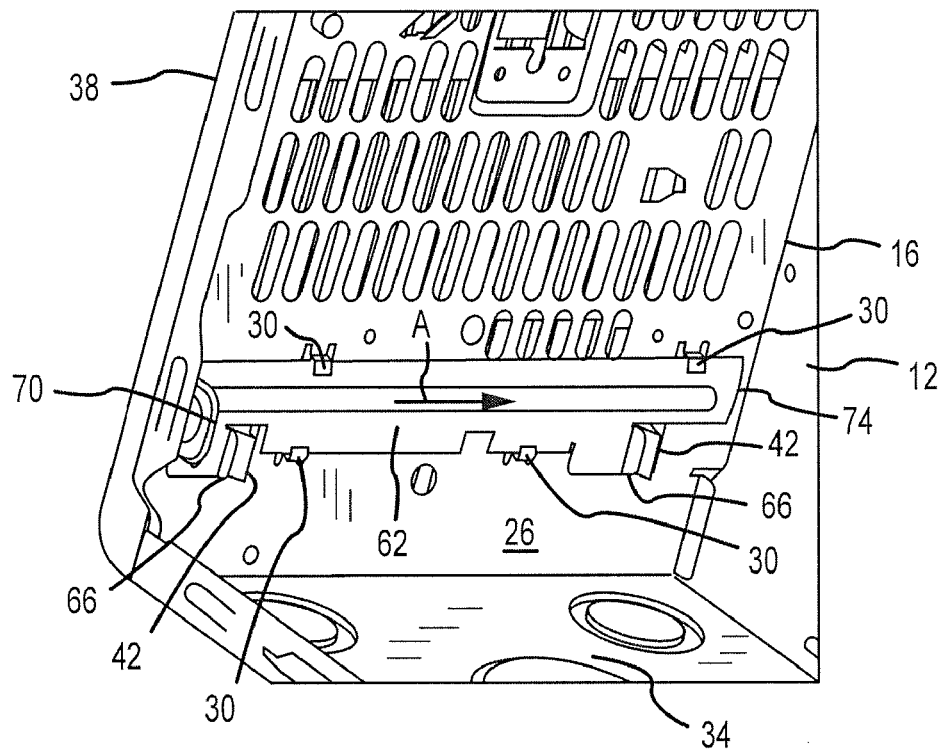
FIG. 3A is a perspective view of the bezel and chassis of the computer housing of FIG. 1A, with the bezel and chassis being in a latched condition and along with a corresponding position of the latch.
Figure 3B:
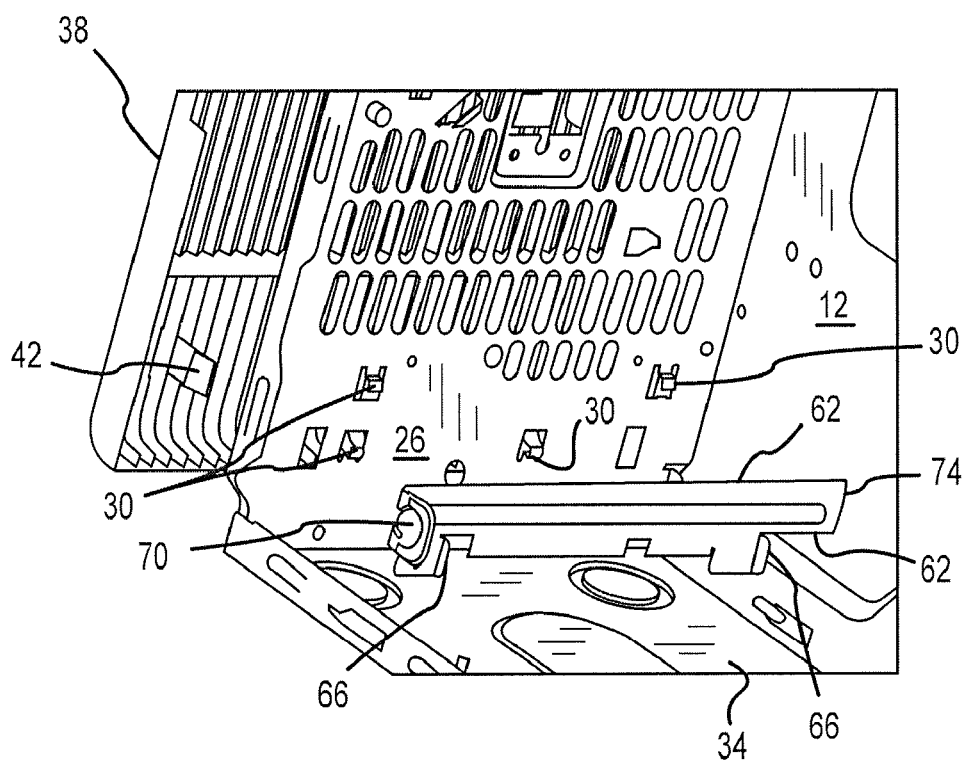
FIG. 3B is an exploded, perspective view of the bezel, chassis, and latch shown in FIG. 3A.

FIGS. 2A-C present various views of the above-noted latch 62, along with one or more snaps or latching members 42 that are used to latch the bezel 38 to the chassis 14. The latch 62 is movably interconnected with the end wall 26 of the chassis 14 in any appropriate manner. In the illustrated embodiment, the end wall 26 of the chassis 14 includes a plurality of latch guides 30 that structurally interconnect the latch 62 to the end wall 26 of the chassis 14, but that also allow the latch 62 to move along what is at least generally an axial path between latching and unlatching positions. Other motions for the latch 62 may be appropriate.

The latch 62 includes an engagement section 66 for each latching member or snap 42 that is used to detachably interconnect the bezel 38 with the chassis 14, along with a handle 70 that may be grasped by an individual to move the latch 62 from a latching position to an unlatching position. The engagement sections 66 may be of any appropriate configuration for interfacing with the snaps 42 to latch and unlatch the bezel 38 from the chassis 14. In the illustrated embodiment, each engagement section 66 includes what may be characterized as a first section 68a and a second section 68b, where the second section 68b may be arcuately or convexly-shaped for providing a desirable interface with the heads 50 of the snaps 42 during unlatching and latching operations.

The snaps 42 may be associated with the bezel 38 in any appropriate manner as well. For instance, the snaps 42 could be integrally formed with the bezel 38 or could be separately attached thereto. In any case, the snaps 42 are movable along with the bezel 38 after the bezel 38 has been unlatched from the chassis 14. Any appropriate number of snaps 42 could be utilized for latching the bezel 38 to the chassis 14.

Each snap 42 includes a stem or body 46, along with a head 50. Each head 50 includes what may be characterized as a latching surface 54 and a camming surface 58. The stem 46 of each snap 42 is extendible through a corresponding snap aperture 18 of the chassis 14. When the bezel 38 is latched to the chassis 14, the latching surface 54 of each head 50 is aligned with a corresponding portion of the chassis 14, or stated another way at least part of each latching surface 54 is offset from its corresponding snap aperture 18 in the end wall 26 of the chassis 14. The latch 62 may be moved such that each of its engagement sections 66 engages a camming surface 58 of the corresponding head 50 of a snap 42, and thereafter moves/deflects the corresponding stem 46 of the snap 42 to dispose the latching surfaces 54 in alignment with the corresponding snap aperture 18 in the chassis 14. Stated another way, the latch 62 may be moved to reposition the head 50 of each snap 42 so as to be aligned with the corresponding snap aperture 18 in the chassis 14. This then allows the heads 50 of each snap 42 to be passed through their corresponding snap aperture 18 in the end wall 26 of the chassis 14 as the bezel 38 is moved away from the chassis 14.

The camming surface 58 of each snap 42 may be of any appropriate configuration and disposed in any appropriate orientation for interfacing with the latch 62 to latch and unlatch the bezel 38 from the chassis 14. In the illustrated embodiment, each camming surface 58 is an at least generally flat surface that is disposed in non-perpendicular relation to the direction in which the latch 62 moves between its latching and unlatching position (corresponding with the arrows A and C, as addressed below). That is, each camming surface 58 is "angled" relative to the direction that the latch 62 moves between its latching and unlatching positions. Generally and as will be discussed in more detail below, what is desirable is for a movement of a head 50 (of snap 42) in one direction (e.g., the "y" dimension) to cause a force to be exerted on the latch 62 in a direction that moves the same back at least toward its latching position (e.g., the "x" direction).

FIGS. 2A-C, 3A, and 4A illustrate the latch 62 in its latching position, where the bezel 38 is latched to the chassis 14. Note that a distal end 74 of the latch 62 is spaced from the corresponding edge 16 of the chassis 14 at this time so as to accommodate movement of the latch 62 to its unlatching position (e.g., so the distal end 74 is spaced from the adjacent side panel 12 of the computer housing 10 when in the latching position). At this time (the latching position), the stem 46 of each snap 42 will typically be in an un-deflected state, but in any case the latching surface 54 of each snap 42 (e.g., the underside of the head 50) is at least partially aligned with the end wall 26 of the chassis 14. That is, movement of the bezel 38 away from the chassis 14 would be restrained at this time or at least limited by an engagement between the latching surface 54 of each head 50 with the chassis 14 (specifically, the end wall 26).

Figure 4A:
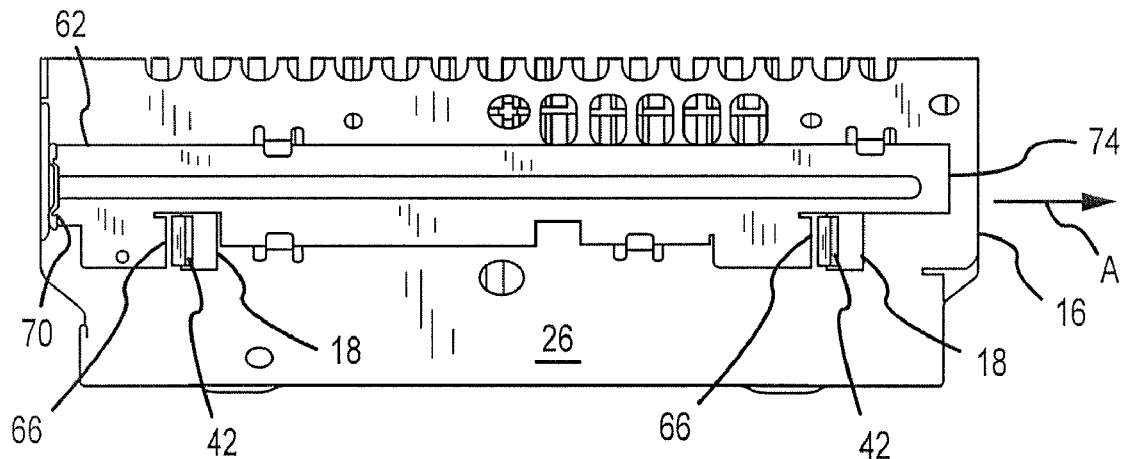
FIG. 4A is a plan view showing the latch and snaps in position to latch the bezel to the chassis for the case of the computer housing of FIG. 1A (the latching position).
Figure 4B:
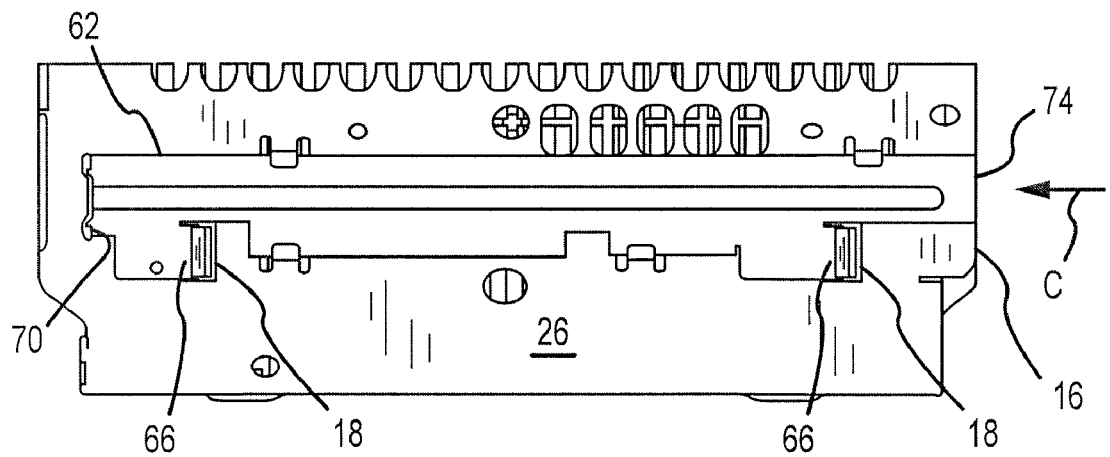
FIG. 4B is a plan view showing the latch in position to unlatch the bezel from the chassis for the case of the computer housing of FIG. 1A (the unlatching position).

The latch 62 may be moved in the direction of the arrow A in FIGS. 2A-C to dispose the same in its unlatching position. Again, this is an axial movement in the illustrated embodiment. An individual may grasp the handle 70 of the latch 62 and move the same such that the engagement sections 66 of the latch 62 move toward their corresponding head 50 of a snap 42. The convexly-shaped second section 68b of each engagement section 66 from the latch 62 will eventually contact the camming surface 58 of its corresponding head 50 of a snap 42. Continued movement of the latch 62 in the direction of the arrow A will thereafter deflect the stems 46 of the snaps 42 or otherwise move the corresponding head 50 in the desired direction (toward alignment with the corresponding snap aperture 18). This movement may continue until the latching surfaces 54 of the snaps 42 "clear" the corresponding edge 22 of the chassis 14 that defines at least part of the corresponding snap aperture 18. At this time, the distal end 74 of the latch 62 may be in contact the adjacent side panel 12 of the computer housing 10, although such need not be the case (e.g., the side panel 12 may function as a motion limiter for the latch 62 if desired/required, and as shown in FIG. 4B). In any case, the head 50 of each snap 50 is also now aligned with its corresponding snap aperture 18 in the chassis 14, such that the bezel 38 is now unlatched from the chassis 14 (e.g., FIG. 4B showing an unlatching position). The bezel 38 may now then be moved away from the chassis 14.

The camming surface 58 of each snap 42 is also used to return the latch 62 to its latching position (e.g., FIGS. 2A-C, FIG. 3A, FIG. 4A, and FIG. 5A). Consider the case where the latch 62 is positioned such that each of its engagement sections 66 is at least partially aligned with a corresponding snap aperture 18 in the chassis 14 (e.g., when the latch 62 remains in its unlatching position after the bezel 38 has been moved away from the chassis 14). When the heads 50 of the snaps 42 are directed back through the corresponding snap aperture 18 in the end wall 26 to latch the bezel 38 to the chassis 14 by a movement at least generally in the direction of the arrow B (e.g., see FIG. 2C, for instance by pivoting the bezel 38 about its upper edge 40 and in accordance with FIG. 6A discussed below), the camming surfaces 58 will thereby contact the latch 62. Based upon the configuration of the camming surfaces 58, continued movement of the snaps 42 at least generally in the direction of the arrow B (FIG. 2C) will move the latch 62 in the direction of the arrow C (e.g., FIGS. 2A-C, 4B, 6B) and back toward its latching position.

Figure 5A:
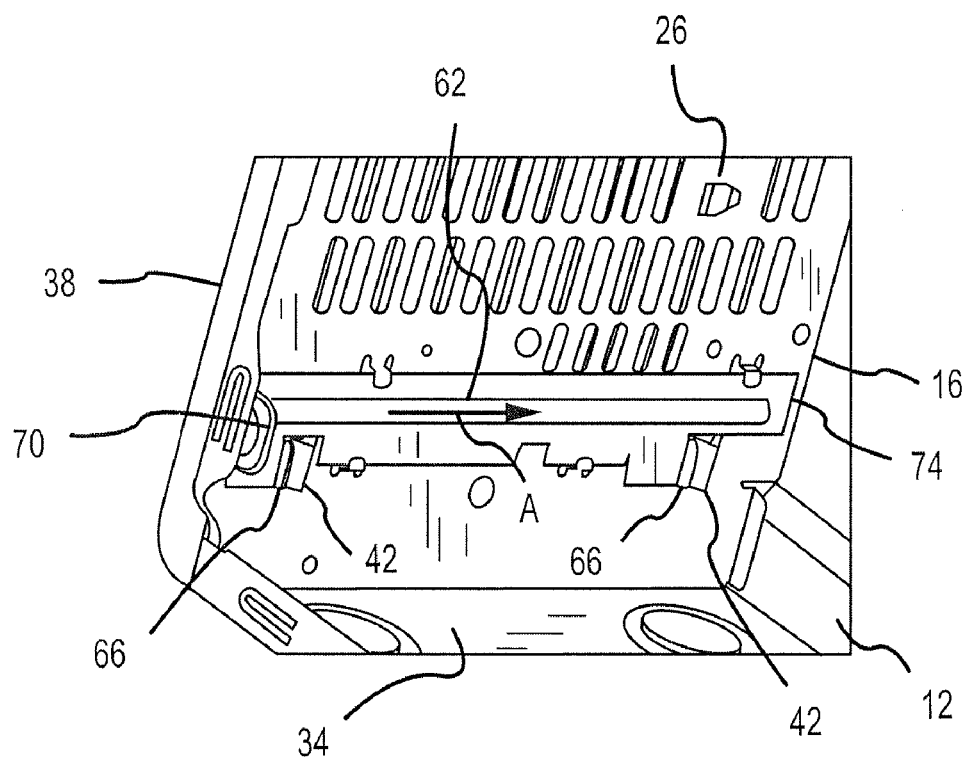
FIG. 5A is a perspective view showing the latch and snaps in position to latch the bezel to the chassis for the case of the computer housing of FIG. 1A.
Figure 5B:
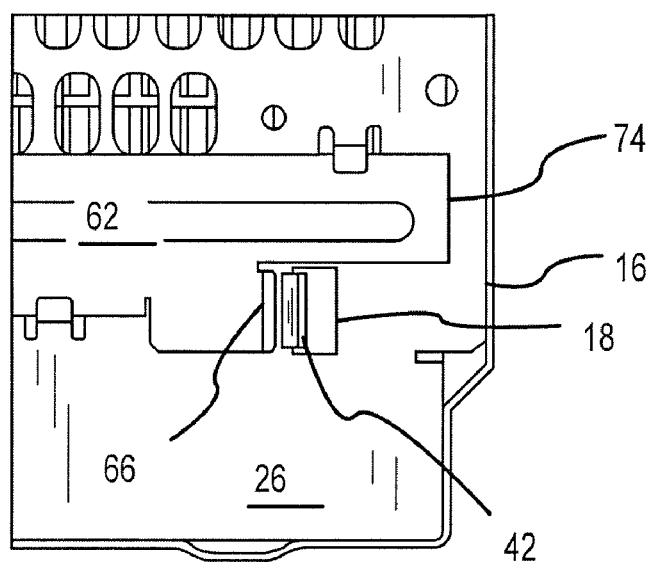
FIG. 5B is an enlarged plan view showing one end of the latch when in the latching position of FIG. 5A.
Figure 5C:
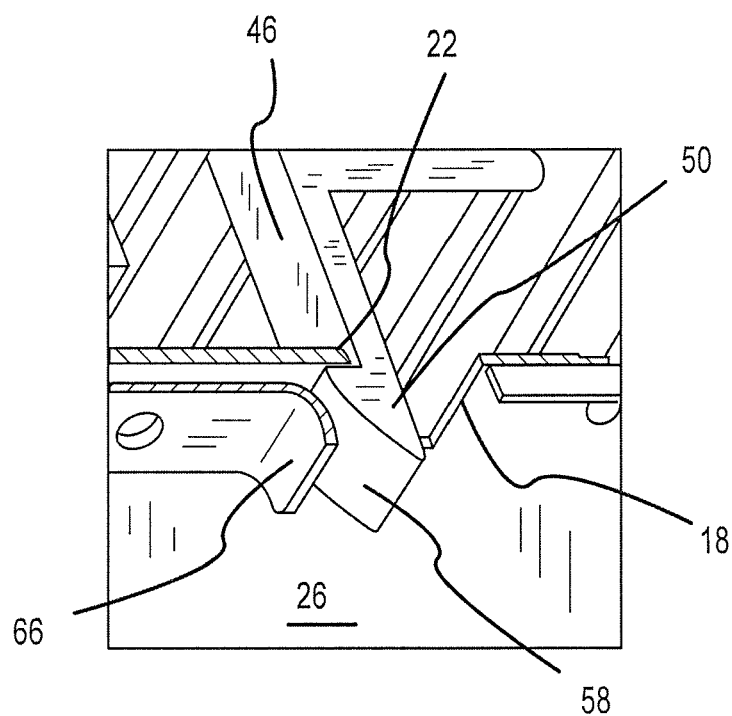
FIG. 5C is an enlarged perspective view showing the head of one of the snaps when in the latching position of FIG. 5A.
Figure 5D:
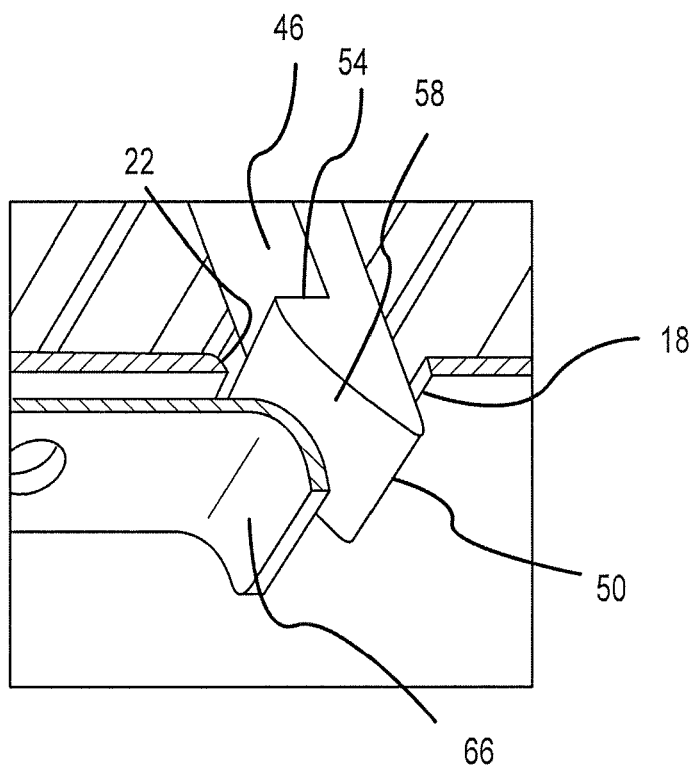
FIG. 5D is an enlarged perspective view showing the latch engaged with the snap shown in FIG. 5C in a manner to unlatch the bezel from the chassis (the unlatching position).
Figure 5E:
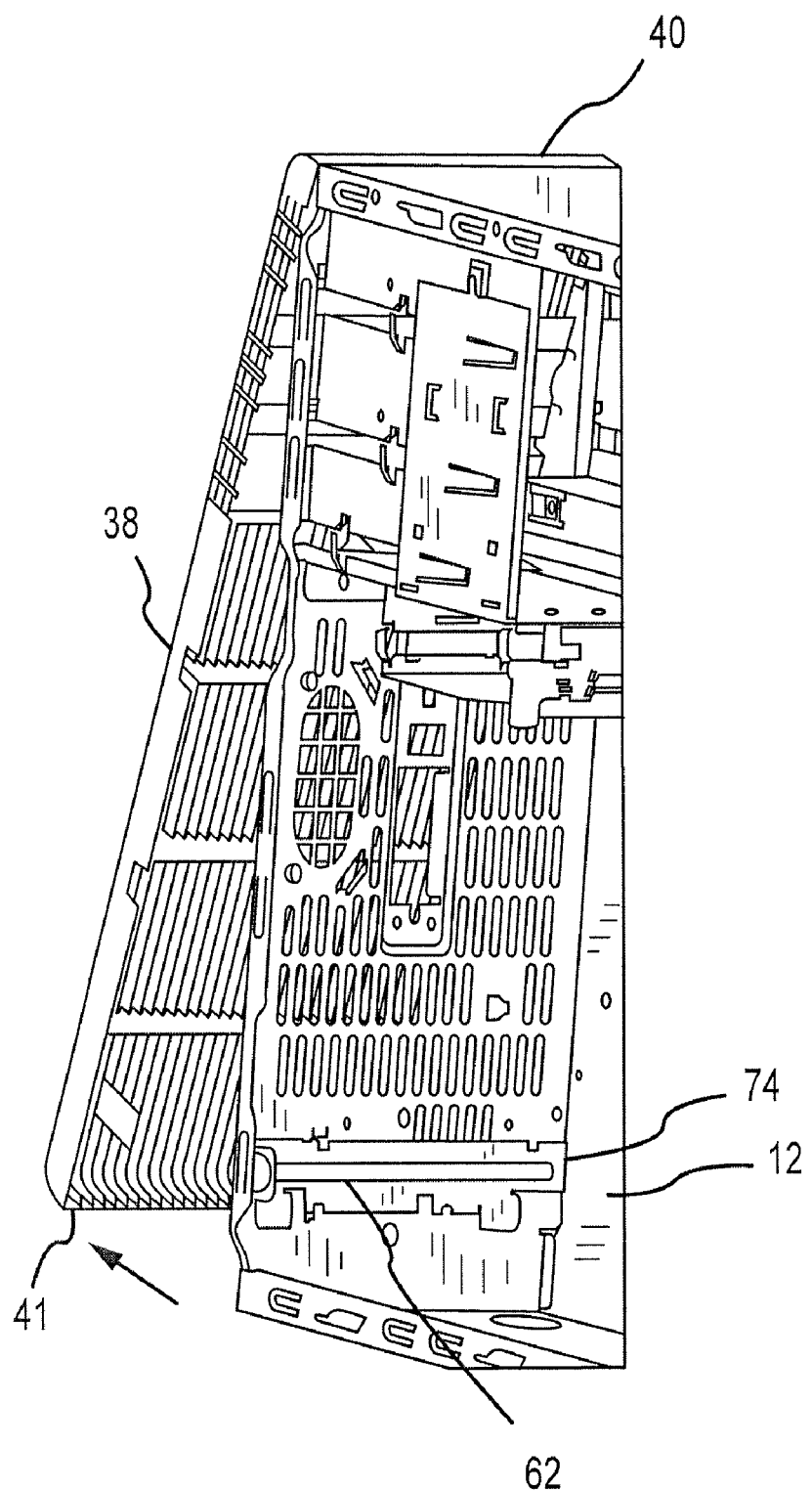
FIG. 5E is a perspective view showing the bezel having been moved away from the chassis after having been unlatched (e.g., in accordance with FIG. 5D).

FIGS. 5A-E summarize how the bezel 38 may be unlatched from the chassis 14. FIGS. 5A-C illustrate the latch 62 in its latching position. Note the spacing of the distal end 74 of the latch 62 from the adjacent side panel 12 at this time (e.g., FIGS. 5A and 5B), and how the edge 22 of the chassis 14 is captured "behind" the head 50 of one of the snaps 42 in FIG. 5C (such that the latching surface 54 is not completely aligned with the corresponding snap aperture 18 in the end wall 26 of the chassis 14). FIG. 5D illustrates the latch 62 having been moved in the direction of the arrow A (e.g., FIGS. 2A-C and 5C) to deflect the stem 46 of its corresponding snap 42 (or so as to otherwise move the corresponding head 50) such that its corresponding latching surface 54 is now aligned with its corresponding snap aperture 18 (or stated another way, such that the entirety of the head 50 of this snap 42 is now aligned with its corresponding snap aperture 18). This then allows the bezel 38 to be moved away from the chassis 14. FIG. 5E illustrates one representative movement of this type. Here, the bezel 38 is pivotally interconnectable with the chassis 14 at its upper edge 40 (e.g., the upper edge 40 may also be detachably interconnected with the chassis 14, but so as to be able to pivot relative to the chassis 14), such that the lower edge 41 of the bezel 38 may be pivoted away from the chassis 14 in accordance with FIG. 5E after having been unlatched in accordance with the foregoing. The bezel 38 could be movably interconnected with the chassis 14 in any appropriate manner.

Figure 6A:
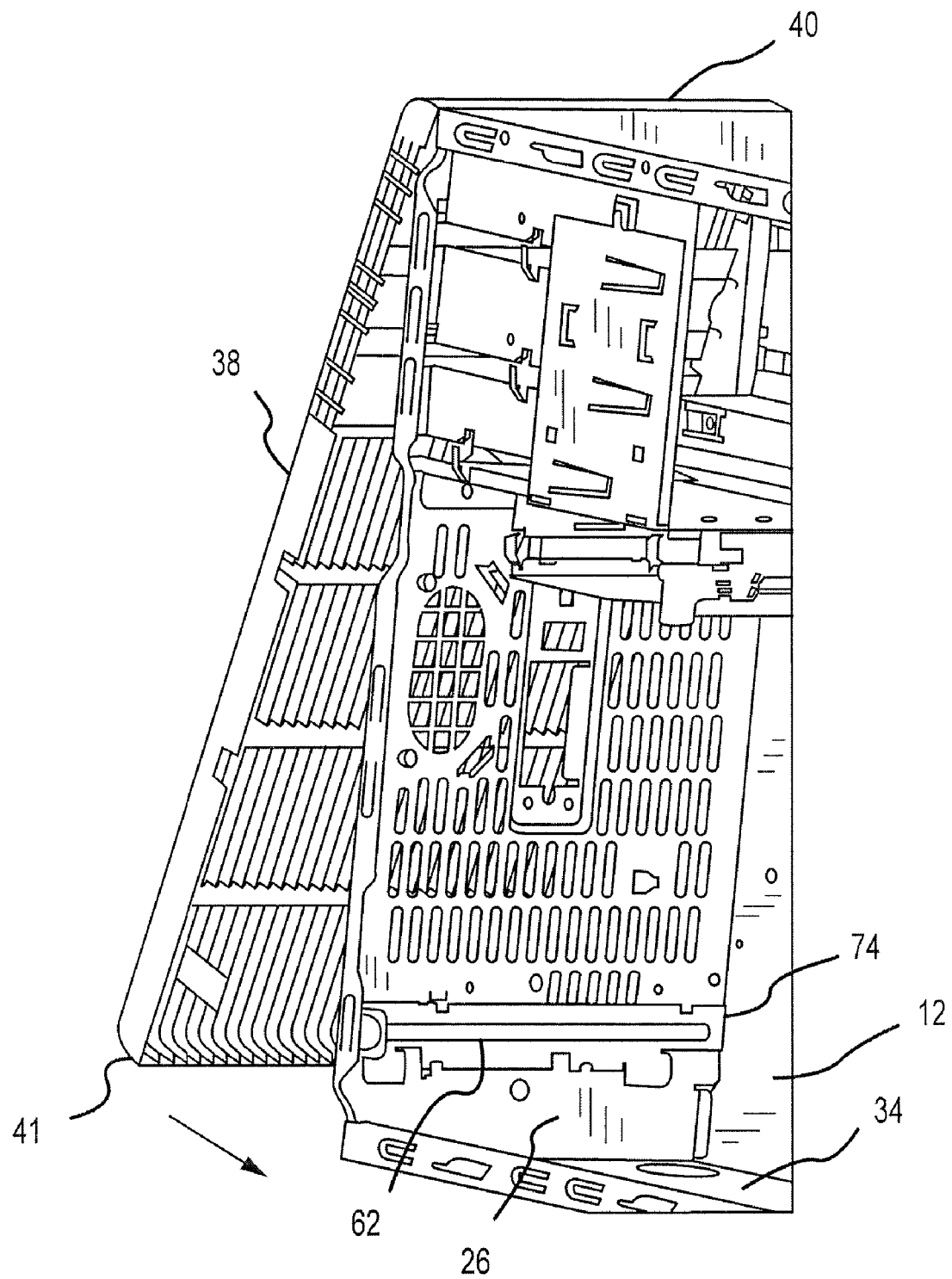
FIG. 6A is a perspective view showing the bezel being moved toward the chassis for purposes of latching the components together, along with the latch being in an unlatching position.
Figure 6B:
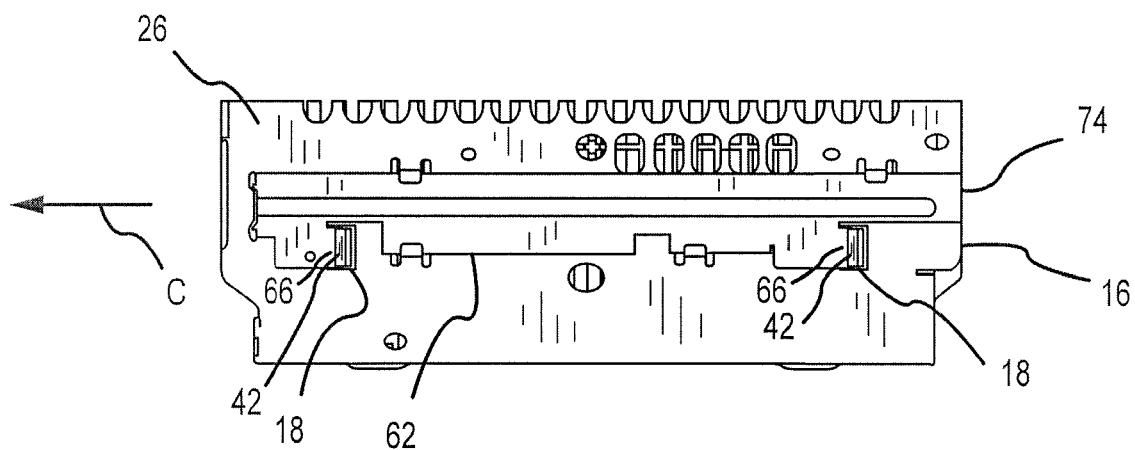
FIG. 6B is a plan view of the latch from FIG. 6A, where again it is in an unlatching position and as the heads of the latching members may be just entering the corresponding snap aperture.
Figure 6C:
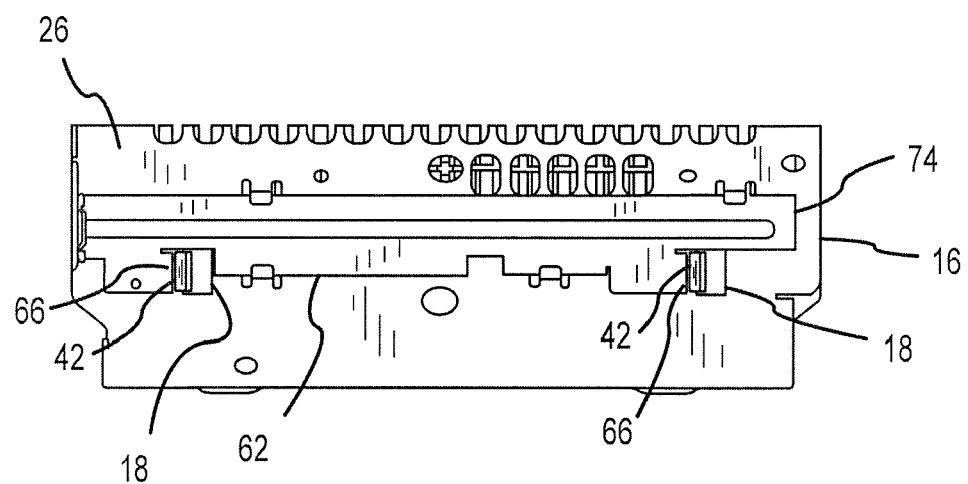
FIG. 6C is a plan view of the latch after having been returned to its latching position by the movement of the bezel toward the chassis and the resulting engagement of the head of the snaps with the latch.

FIGS. 6A-C summarize how the bezel 38 may be latched to the chassis 14. FIG. 6A illustrates that the upper edge 40 of the bezel 38 may be pivotally attached to the chassis 14 as noted above (e.g., detachably). Note that the latch 62 has remained in its unlatching position at this time and as illustrated in FIGS. 6A and 6B. When the latch 62 is in its unlatching position (e.g., FIGS. 6A and 6B), once again its engagement sections 66 may be at least partially disposed over or in alignment with the corresponding snap aperture 18 in the end wall 26 of the chassis 14. As the bezel 38 is moved back toward the chassis 14, for instance in accordance with the arrow presented in FIG. 6A where the bezel 38 pivots at least generally about its upper edge 40, the head 50 of the snaps 42 will be forced into their corresponding snap aperture 18 on the end wall 26 of the chassis 14. This will then cause the camming surface 58 of each snap 42 to engage typically the corresponding second section 68b of the latch 62. Based upon the configuration of the camming surfaces 58, continued movement of the heads 50 toward their latched position of FIGS. 2A-C will move the latch 62 in the direction of the arrow C that is noted in various figures. That is, the configuration of the camming surfaces 58 cause the heads 50 of the snaps 42 to exert a force on the latch 62 in a direction that is at least generally orthogonal to the direction in which the heads 50 are actually moving. If one considers that the heads 50 are moving at least generally in the "y" dimension when being moved through their corresponding snap aperture 18 to latch the bezel 38 to the chassis 14, the camming surfaces 58 of the heads 50 will exert a force on the latch 62 in the "x" dimension to move the latch 62 back to its latching position.

Based upon the foregoing, the latch 62 and snaps 42 collectively alleviate the need to provide a biasing spring or the like to return the latch 62 to is latching position after an unlatching operation. It should be appreciated that the latch 62 could assume various positions after an unlatching operation. In this regard, the latch 62 may be characterized as a "free sliding" structure, so that it is possible that the latch 62 could move back toward its latching position after unlatching the bezel 38 from the chassis 14, for instance caused by a certain movement of the computer housing 10). Therefore, the bezel 38 will not necessarily move the latch 62 the same distance for each latching operation. Moreover and as illustrated in FIG. 2A, the latch 42 may be integrated so as to have to move at least a certain amount toward its unlatching position before actually engaging the heads 50 of the snaps 42. However, such may not need to be the case in all instances.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. An assembly, comprising:
    a first part comprising a first latching member, that in turn comprises a camming surface;
    a second part, wherein said first latching member is engageable with said second part to latch said first and second parts together; and
    a latch, wherein said latch is manually movable from a latching position to an unlatching position, wherein said latch engages said first latching member when moved to said unlatching position to unlatch said second part from said first part, and wherein when said first and second parts are moved toward one another said camming surface of said first latching member engages said latch to move said latch from said unlatching position back to said latching position such that said first and second parts are then latched together.

2. The assembly of claim 1, wherein said first part is a bezel and said second part is a computer chassis.

3. The assembly of claim 1, wherein said latch is a free sliding structure.

4. The assembly of claim 1, wherein said first latching member is deflectable from a latched position to an unlatched position by a movement of said latch away from said latching position.

5. The assembly of claim 1, wherein said camming surface is disposed in non-perpendicular relation to a portion of said latch that is engaged by said camming surface to move said latch back to said latching position.

6. The assembly of claim 1, wherein said first latching member is in the form of a snap.

7. The assembly of claim 1, wherein said latch is movable at least generally along an axial path.

8. The assembly of claim 1, wherein said latch is biased to said latching position primarily by an engagement of said camming surface of said first latching member with said latch.

9. The assembly of claim 1, wherein said first latching member is movable between a latched position and an unlatched position, wherein said first and second parts are latched together with said first latching member being in said latched position, wherein said first and second parts are unlatched from each other when said first latching member is in said unlatched position, and wherein a movement of said latch away from said latching position disposes said first latching member in said unlatched position.

10. The assembly of claim 9, wherein moving said first latching member from said unlatched position to said latched position causes said camming surface of said first latching member to move said latch back to said latching position.

11. An assembly, comprising:
    a first part comprising a first latching member, that in turn comprises a head, wherein said head comprises a latching surface and a camming surface;
    a second part, wherein said latching surface of said first latching member is engageable with said second part to latch said first and second parts together;

a latch; and means for returning said latch from an unlatching position back to a latching position, wherein said latch is manually movable from said latching position to said unlatching position to engage said first latching member and move said latching surface out of a locking alignment with said second part such that said first and second parts may be moved apart, wherein when said first and second parts are moved toward one another said first latching member is movable relative to said latch such that said camming surface of said first latching member engages and moves said latch from said unlatching position back to said latching position to allow said latching surface of said first latching member to be in a locking alignment with said second part such that said first and second parts are then latched together, and wherein said means for moving is said camming surface of said first latching member.

12. The assembly of claim 11, wherein said first part is a bezel and said second part is a computer chassis.

13. The assembly of claim 11, wherein said first latching member is movable from a latched position to an unlatched position by being forcibly engaged by said latch during a movement of said latch.

14. The assembly of claim 11, wherein said first latching member is deflectable from a latched position to an unlatched position by being forcibly engaged by said latch during a movement of said latch.

15. The assembly of claim 11, wherein said camming surface of said first latching member is disposed in non-perpendicular relation to a portion of said latch that is engaged by said camming surface.

16. The assembly of claim 11, wherein said first latching member is in the form of a snap.

17. The assembly of claim 11, wherein said latch is movable at least generally along an axial path.

18. The assembly of claim 11, wherein said latch is biased to said latching position primarily by an engagement of said camming surface of said first latching member with said latch.

19. The assembly of claim 11, wherein said first latching member is movable between a latched position and an unlatched position, wherein said first and second parts are latched together with said first latching member being in said latched position, wherein said first and second parts are unlatched from each other when said first latching member is in said unlatched position, and wherein a movement of said latch into a forcible engagement with said first latching member disposes said first latching member in said unlatched position.

20. The assembly of claim 19, wherein moving said first latching member from said unlatched position to said latched position causes said camming surface of said first latching member to move said latch back to said latching position.

21. An assembly, comprising:
a first part comprising a first latching member, that in turn comprises a head;
a second part comprising an aperture, wherein said head of said first latching member is extendable through said aperture to engage said second part in a manner so as to latch said first and second parts together;
a latch that is a free sliding structure; and
means for returning said latch from an unlatching position back to a latching position, wherein said latch is manually movable from said latching position to said unlatching position to engage said head of said first latching member and move said head into alignment with said aperture to unlatch said second part from said first part such that said first and second parts may be moved apart, and wherein when said first and second parts are moved toward one another said first latching member is moved relative to said latch such that said head of said first latching member is extendable through said aperture to engage and move said latch back to said latching position and such that said first latching member latches said first and second parts together, wherein said means for returning is said head of said first latching member.

22. A method for unlatching and latching first and second parts, comprising the steps of:
executing a first moving step comprising moving a latch from a first position to a second position, wherein said latch is movably interconnected with said second part, wherein said first and second parts are latched together when said latch is in said first position by a first latching member of said first part engaging said second part;
executing a second moving step comprising moving said first latching member to an unlatching position in response to said first moving step and which unlatches said first part from said second part;
executing a third moving step comprising moving said first and second parts away from each other after said second moving step;
executing a fourth moving step comprising moving said first and second parts back toward each other after said third moving step and which latches said first and second parts back together by said first latching member of said first part engaging said second part; and
executing a fifth moving step comprising moving said latch back toward said first position in response to execution of said fourth moving step.

23. A method for unlatching and latching first and second parts, comprising the steps of:
moving a latch from a first position to a second position, wherein said latch is movably interconnected with said second part, wherein said first and second parts are latched together when said latch is in said first position by a first latching member of said first part engaging said second part;
moving said first latching member to an unlatching position while being engaged by said latch as said latch is moving toward said second position;
unlatching said first and second parts when said first latching member is in said unlatching position;
executing a first relative movement step comprising moving said first part relative to said second part and into a spaced apart position after said unlatching step;
executing a second relative movement step comprising moving said first and second parts back toward each other from said spaced apart position; and
latching said first and second parts together using said second relative movement step to engage said first latching member of said first part with said second part, wherein said first latching member engages said latch during said latching step to move said latch back toward said first position.

* * * * *